United States Patent [19]

Imazaki

[11] 4,220,675

[45] Sep. 2, 1980

[54] METHOD OF METALIC FINISHING

[75] Inventor: Yoshio Imazaki, Hiratsuka, Japan

[73] Assignee: Kansai Paint Co., Ltd., Japan

[21] Appl. No.: 909,836

[22] Filed: May 26, 1978

[30] Foreign Application Priority Data

Jun. 14, 1977 [JP] Japan ................................. 52-70196

[51] Int. Cl.² ........................ B05D 1/06; C25D 13/06
[52] U.S. Cl. ................................... 427/27; 204/181 T;
427/195; 427/388.3; 427/388.5; 427/409;
427/421; 428/460; 428/463
[58] Field of Search ............... 427/409, 385 R, 385 B,
427/386, 388 D, 27, 195, 421, 388 B; 260/850;
204/181 T; 428/460, 463

[56] References Cited

U.S. PATENT DOCUMENTS

| | | | |
|---|---|---|---|
| 3,904,795 | 9/1975 | Mercurio | 427/409 X |
| 3,953,644 | 4/1976 | Camelon et al. | 428/220 |
| 3,954,899 | 5/1976 | Chang et al. | 260/850 X |
| 3,959,521 | 5/1976 | Suetsugi et al. | 427/409 X |
| 3,976,715 | 8/1976 | Labana et al. | 260/836 |
| 3,980,732 | 9/1976 | Isaksen et al. | 427/195 X |
| 3,988,494 | 10/1976 | McAdow | 427/409 X |
| 3,991,230 | 11/1976 | Dickie et al. | 427/409 X |
| 3,998,716 | 12/1976 | Masar et al. | 427/27 X |
| 4,044,175 | 8/1977 | Coxon et al. | 427/195 |
| 4,053,682 | 10/1977 | Donermeyer | 427/409 X |
| 4,082,884 | 4/1978 | DeLong | 427/409 X |

FOREIGN PATENT DOCUMENTS

51/115545 10/1976 Japan.
51-117733 10/1976 Japan.
51-130439 11/1976 Japan.
52-069446 6/1977 Japan.

*Primary Examiner*—Michael F. Esposito
*Assistant Examiner*—Thurman K. Page
*Attorney, Agent, or Firm*—Ostrolenk, Faber, Gerb & Soffen

[57] ABSTRACT

A method of metallic finishing which comprises the steps of: applying a thermosetting liquid coating material to a substrate, further applying thereon a transparent thermosetting powder coating material, and baking both coated films to cure them simultaneously. The above liquid coating material contains a film forming component of thermosetting resin and a pigment to give metallic appearance and the thermosetting resin component contains a cross liking agent of melamine formaldehyde resin which is modified with a monohydroxyl compound having a boiling point in the range of 150° to 250° C. at 1 atm. The obtained coating film is free from the defects of cratering, pinholing, and the like and has quite excellent appearance such as metallic effect and high gloss.

10 Claims, No Drawings

METHOD OF METALIC FINISHING

BACKGROUND OF THE INVENTION

1. Field of the Invention

This invention relates to a method of metallic finishing. More particularly, the invention relates to a method of metallic finishing to form the coating films which are excellent in surface appearance, especially in the smoothness and metallic effect of the coating films. The method of the invention comprises two coating steps and one baking step (hereinafter referred to as "2 coat-1 bake system").

2. Description of Prior Art

In recent years, powder coating materials containing no solvent have been widely employed and the utility thereof is rapidly expanded since they are advantageous in view of the prevention of environmental pollution. As the method for applying powder coating materials, the electrostatic spraying is generally employed, with which method it is possible to form a high build coating of more than 50 microns in thickness by a single coating. Further, the recovery of scattered coating powder is so easy that the loss of coating material is small thereby affording economical advantages.

In the case of the powder coating material containing metal powder or both metal powder and coloring pigment, however, it is quite difficult to produce the metallic appearance like that of the conventional solvent type metallic coating material by the electrostatic spraying because the intensity of electric charge of metal powder is different from that of the film forming component of resin, and the molten viscosity of the powder coating material is high which results in the poor orientation of metal powder. Therefore, it has never been put into industrial practice.

In the case that a common solvent type thermosetting coating material containing metallic powder is first coated, a transparent thermosetting coating material is then coated and after that, the coated films are cured. In such 2 coat-1 bake system, several surface defects such as gushing (pinholing by solvent popping, cratering and the like, hereinafter referred to as "gushing"), surface roughness caused by poor levelling, unevenness of metallic effect and dulling of gloss are caused to occur, which are believed to be caused by the solvent of the solvent type thermosetting coating material remaining the coating film and the by-product of thermal curing reaction. Therefore, the 2 coat-1 bake system of such coating materials are not accepted in the practical industries.

Further, there are proposed some relevant methods in the technical references, which will be described in the following.

In the method described in Published Unexamined Japanese Patent Application No. 51-87545 (1976) filed by Ford Motor Co., a base coat of aqueous coating material containing aluminium powder is first applied and it is cured at 107° C. for 10 minutes. An acrylic powder coating material (clear) is then applied and cured at 177° C. for 25 minutes, thereby obtaining a coating film having good metallic appearance. The aqueous coating material is of acrylic type which is cured with a specific melamine resin (hexakis methoxymethyl melamine) and the power coating material (clear) is glycidyl functional type acrylic resin which is cured by a dibasic acid. Since the above cited method is based on 2 coat-2 bake system and another type of alcohol is used in modifying the melamine resin, No. 51-87545 is different from the present invention.

In the method described in Published Unexamined Japanese Patent Application No. 51-115545 (1976) filed by Kansai Paint Co., Ltd., the substrate material is firstly degreased and subjected to phosphate conversion treatment. Then, it is applied with an anticorrosive primer by electrodeposition and a intermediate coating material as a surfacer. Further, it is applied with a nonaqueous dispersion resin coating material containing aluminium powder (base coat) and settled for 4 minutes at room temperature. After that, an acrylic powder coating material (clear) is applied thereto and baked at 180° C. for 20 minutes, thereby obtaining a coating film having good metallic effect. The non-aqueous dispersion resin coating material used in this method is acrylic type one containing a curable component of butylated melamine resin and the powder coating material is based on an acrylic resin of glycidyl functional type which is cured by dibasic acid.

In Published Unexamined Japanese Patent Application No. 51-117733 (1976) filed by the same applicant is disclosed a similar method to No. 51-115545 except that the acrylic powder coating material contains a small quantity of coloring pigment.

In the disclosure of Published Unexamined Japanese Patent Application No. 51-130439 (1976) filed by Kansai Paint Co., Ltd. a substrate material is applied with a water-soluble and/or water-dispersible coating material (base coat) containing metal powder and it is further applied with acrylic or polyester powder coating material (clear, a small quantity of coloring pigment may be contained). After that, both the coating films are simultaneously cured to form a coating having good metallic appearance. In this method, the water-soluble or water-dispersible acrylic resin or polyester resin in the bare coat is cured by water-soluble or water-dispersible melamine resin, benzoguanamine resin or urea resin.

There is another relevant reference, Published Unexamined Japanese Patent Application No. 52-69446 (1977) dated June 9, 1977 and filed by Kansai Paint Co., Ltd. In the method of this reference, a solvent type thermosetting coating material containing metal powder (base coat) is applied to a substrate material, and then the content of volatile matter in the coating film is reduced to 6% by weight or less by heating at 170° C., for 10 minutes. A transparent thermosetting power coating material is then applied over that and both the coating films are simultaneously cured by baking to form a finished coating film having good metallic appearance. Thus, No. 52-69446 discloses substantially the same method as 2 coat-2 bake system.

In these methods described in the above references, however, there remains still several disadvantages. For example, the technical contents of Nos. 51-87545 and 52-69446 are directed to a 2 coat-2 bake system, in which system it is impossible to keep dust and the like from sticking to a coating film of the base coat because of carrying out a bake operation previous to a topcoat application process. As a consequence, the resultant finishing aspect would often degrade. Also in Nos. 51-115545, 51-117733, and 51-130439, as measures to prevent gushing, properties of the topcoat resin can not help being relied on. Therefore, in these prior arts there is a defect that the resins which they can use are substantially limited taking weathering resistance thereof into consideration.

BRIEF SUMMARY OF THE INVENTION

In order to solve the above-described problems and to eliminate the disadvantages, the present inventor has carried out wide and extensive investigations. As the result, the present invention has been accomplished in which, in the 2 coat-1 bake system combinedly using a thermosetting liquid coating material containing metal powder, and a transparent thermosetting powder coating material, the thermosetting liquid coating material contains a cross linking agent of melamine formaldehyde resin which is modified with a specific monohydroxyl compound.

It is, therefore, the primary object of the present invention to provide an improved method of metallic finishing which is free from the defects of gushing, surface roughness, unevenness of metallic appearance or the like.

It is another object of the present invention to provide a method of metallic finishing with which quite excellent metallic finishing having good appearance such as metallic effect, thigh gloss, high film-build and the like can be obtained.

It is a further object of the present invention to provide a method of metallic finishing which can be put into practice without difficulty and at low cost.

In accordance with the present invention, the method of metallic finishing comprises the steps of: applying a thermosetting liquid coating material (hereinafter referred to as "base coat") to a substrate, then applying a transparent thermosetting powder coating material (hereinafter referred to as "top coat") to the above coated surface, and baking both the coated films to cure them simultaneously. The above liquid coating material contains a film forming component of thermosetting resin and a pigment for giving metallic appearance to the finished coating and the thermosetting resin component contains a cross linking agent of melamine formaldehyde resin which is modified with a monohydroxyl compound having a boiling point in the range of 150° to 250° C. at 1 atm.

DETAILED DESCRIPTION OF THE INVENTION

The monohydroxyl compounds which are used for modifying the melamine formaldehyde resin are aliphatic monohydric alcohols, aromatic monohydric alcohols, alicyclic monohydric alcohols, glycol monoalkyl ethers and glycol monoalkyl esters having boiling points of 150° to 250° C. at 1 atm. Exemplified as typical ones are:

|  | b.p. (° C.) at 1 atm. |
|---|---|
| 1-hexanol (or n-hexanol) | 158 |
| cyclohexanol | 161 |
| 1-heptanol | 177 |
| 2-heptanol | 160 |
| 3-heptanol | 156 |
| benzyl alcohol | 205 |
| methyl cyclohexanol | 165 |
| 1-n-octanol | 195 |
| 2-n-octanol | 178 |
| 2-ethylhexanol | 183 |
| phenyl methyl carbinol | 204 |
| 1-nonanol | 214 |
| 2-nonanol | 198 |
| 3,3,5-trimethyl cyclohexanol-1 | 198 |
| 1-decanol (or n-decyl alcohol) | 232 |
| 2-decanol | 217 |
| 1-undecanol | 247 |

-continued

|  | b.p. (° C.) at 1 atm. |
|---|---|
| 2-undecanol | 228 |
| 2,6,8-trimethylnonyl-4-alcohol | 225 |
| ethylene glycol monobutyl ether | 171 |
| ethylene glycol monohexyl ether | 208 |
| ethylene glycol monooctyl ether | 228 |
| ethylene glycol monophenyl ether | 240–248 |
| diethylene glycol monomethyl ether | 193 |
| diethylene glycol monoethyl ether | 195–202 |
| diethylene glycol monobutyl ether | 230 |
| ethylene glycol monoacetate | 182 |

As the modifying agent for the melamine formaldehyde resin of the base coat, when a monohydroxyl compound having a boiling point below 150° C. at 1 atm. is used, the evaporation of the monohydroxyl compound which is liberated by the reaction between the functional groups (described later) and the modified melamine formaldehyde resin is caused to occur abruptly, therefore, gushing is brought about even in the coating film of top coat, and the metallic effect and the gloss of the obtained coating film become worse. On the other hand, when the monohydroxyl compound having a boiling point above 250° C. is used, the rate of curing by baking becomes slow and much monohydroxyl compound which is liberated in the curing reaction remains in the coating film after the baking so that the hardness of the obtained coating film becomes low. In addition, owing to the above facts, the solvent resistance of coating film also becomes worse. In the case that the monohydroxyl compounds having boiling points in the range of 150° to 250° C. are employed, the evaporation to the outside of coating film of the free monohydroxyl compound formed in the curing reaction can be brought about gradually at an adequate rate during the baking after the application of the top coat. Therefore, the metallic coating having quite desirable properties of metallic effect, high gloss and agreeable touch can be obtained without causing the gushing.

In the general preparation method for obtaining the melamine formaldehyde resin using the above monohydroxyl compound having a boiling point of the above-described range as the modifying agent, the reaction of the first step is carried out by using 2 to 8 moles of formaldehyde and 4 to 15 moles of monohydroxyl compound per 1 mole of melamine. The conditions for the reaction are, for example, 1.5 to 3 hours at 80° to 100° C. Then, a low boiling point hydrocarbon solvent such as n-hexane, n-heptane or cyclohexane, is added to the reaction system as an auxiliary dehydrating agent so as to promote the dehydration reaction, and after that, the hydrocarbon solvent and excess monohydroxyl compound are removed from the reaction system under a reduced pressure.

In this reaction, if desired, an amino compound having an active hydrogen joined to a nitrogen atom, for example, a triazine compound such as benzoguanamine, and urea can be used in place of the melamine. Further, as the formaldehyde the aqueous solution of formaldehyde and alcohol solution of formaldehyde which are commonly soled as formalin, and paraformaldehyde can be used.

As described above, the thermosetting resin in the base coat contains a modified melamine formaldehyde resin as a cross linking component. The functional resin which is combined with the modified melamine formaldehyde resin may be any of the functional resins which are used for the common baking coating material of solvent type or dispersion resin type, as long as they react with the melamine formaldehyde resin when heated. Exemplified as the functional resins of this kind which are suitable for the use in the base coat of the present invention, are hydroxyl group functional acrylic copolymer resins of organic solvent type, aqueous solution type, non-aqueous dispersion type or aqueous dispersion type (or emulsion type), non-oil or oil (or fatty acid) modified alkyd resins or polyester resins of organic solvent type, aqueous solution type or aqueous dispersion type, and epoxy resin esters of organic solvent type, aqueous solution type of aqueous dispersion type.

The examples of the pigments which is mixed into the base coat of the present invention in order to give the metallic appearance of coated surfaces, are the metallic pigments or non-metallic pigments of fine flakes, leaves or cinders. Exemplified as such pigments are aluminum powder (leafing type or non-leafing type), bronze powder, copper powder, mica powder, treated mica powder (the mica powder deposited with a thin film of, for example, titanium oxide) and micaceous iron oxide. The compounding ratio of these pigments may be generally in the range of 3 to 30 parts (by weight, the same shall apply hereinafter) to 100 parts of the thermosetting resin (as solid content) of the film forming component.

Further, besides the above pigments to impart metallic appearance, other components which are commonly used for coating materials, for example, coloring agents such as inorganic pigments, organic pigments and oil-soluble dyestuffs, and other additives such as dispersing agents, curing accelerators and surface levelling agents may also be added to the base coat of the present invention.

The base coat having the composition described above can be prepared quite easily by adding and dispersing pigments and other components in accordance with the conventionally known process or method.

The top coat of the present invention contains, as the main component, the powder of thermosetting resin. The resin powder, if not a self-curable resin, may contain a cross-linking agent or curing agent. Further, it can be compounded with coloring agents and other additives. In view of the physical properties and weather resistance, the composition mainly composed of thermosetting acrylic resin or thermosetting polyester resin, is generally preferred. In the present invention, however, the component is not restricted to the above resins.

In the preparation of the top coat by using for example a thermosetting acrylic resin, a vinyl monomer having glycidyl groups or hydroxyl groups such as glycidyl methacrylate, glycidyl acrylate, hydroxyethyl acrylate or hydroxyethyl methacrylate, is used as the functional monomer, and the alkyl ester of acrylic acid or methacrylic acid or styrene as a nonfunctional monomer. They are copolymerized by well known copolymerization process to obtain a copolymer resin having a glass transition temperature of 50° to 80° C. To this copolymer, a polycarboxylic acid, blocked isocyanate compound or modified melamine resin is added as a component of curing agent, and if desired, a surface levelling agent and a cissing controlling agent are added to the composition. Then it is subjected to the well known powder making process which comprises the steps of, for example, mixing, melting, kneading, cooling, pulverizing and classifying.

If desired, a coloring agent or agents can be added to the top coat of the present invention. In the preparation of a transparent colored top coat, the common organic pigment, inorganic pigment or oil-soluble dyestuff can be used and the quantity of the coloring agent must be controlled within such range that, when the top coat is applied over the base coat, the metallic appearance of the finished coating is not impaired.

The practice of the method of the present invention will be exemplified in the following.

The viscosity of a base coat is adjusted to 10 to 30 seconds (Ford cup #4 at 20° C., this shall apply hereinafter) by using a predetermined diluent. By air spraying or electrostatic spraying, the base coat is applied to the surface of a substrate (for example, a surface treated steel sheet, aluminium sheet, etc.) or a substrate which is previously supplied with a primer, thereby forming a coating film of 10 to 40 microns in dried thickness. The coated substrate is then settled for 30 seconds to 30 minutes at an ordinary temperature, or if necessary, it is heated to about 100° C. for several minutes. After that, the top coat is applied to the coated substrate by electrostatic coating method so as to form a 50 to 150 microns thickness of film when measured after the baking. The baking is done at a temperature of 150° to 200° C. for 10 to 45 minutes, in which both the coating films of base coat and top coat are simultaneously cured. By the above procedure, the metallic finish of the present invention having excellent smoothness and metallic gloss can be attained.

By using the modified melamine formaldehyde resin as an indispensable component of the base coat of the present invention as described above, the appearance of metallic finish coating in the two-coat one-bake system can be markedly improved without causing the defects of gushing, surface roughness and unevenness of metallic effect of the coating film but the smoothness of the obtained coating film is quite good.

In the following, the present invention will be further described in detail with reference to several examples and comparative examples. In the examples, the term parts and % are by weight unless otherwise indicated.

EXAMPLE 1

(A) Preparation of modified melamine formaldehyde resin solution A

A flask equipped with a stirrer was fed with 126 parts of melamine, 550 parts of 37% aqueous solution of formaldehyde, and 1000 parts of ethylene glycol monobutyl ether, and the contents were heated at 90° C. for 2 hours. Then, 100 parts of n-heptane and 0.3 part of phthalic anhydride were added to the reaction system and the reaction temperature was raised to perform dehydration under refluxing for 3 hours. After that, the n-heptane and excess ethylene glycol monobutyl ether were removed under a reduced pressure until the non-volatile matter in the system became 50%. The characteristic values of the obtained resin solution were a non-volatile matter of 50%, acid value of less than 1, viscosity of F-G (by Gardner bubble viscometer) and mineral spirit allowance of 10-20.

(B) Preparation of base coat A

As a dispersion stabilizer, 210% of a grafted product of poly-1,2-hydroxystearic acid and methacrylic acid copolymer was used to a mixture of vinyl monomer consisting of 30% of styrene, 30% of methyl methacrylate, 23% of 2-ethylhexyl acrylate, 15% of hydroxyethyl acrylate and 2% of acrylic acid, thereby preparing a non-aqueous dispersion resin in n-heptane. The resin content of this resin dispersion was 60% and the degree of dispersion was 20%. By using this non-aqueous dispersion resin and the modified melamine formaldehyde resin solution A of the item (A), a base coat A containing 60% non-volatile matter was prepared according to the following formula, in which powdered aluminum paste was dispersed.

| Base Coat A | Parts |
| --- | --- |
| Non-aqueous dispersion resin (in n-heptane) | 125 |
| Modified melamine formaldehyde resin solution A | 50 |
| Non-leafing type powdered aluminum paste (trademark: Aluminum Paste #1109 MA, made by Toyo Aluminum Co., Ltd.) | 12 |
| | 187 parts |

(C) Preparation of top coat A

A three neck flask equipped with a stirrer and a reflux condenser, was fed with 20 parts of styrene, 43 parts of methyl methacrylate, 18 parts of n-butyl acrylate, 3 parts of ethyl acrylate, 13 parts of glycidyl methacrylate, 3 parts of hydroxyethyl methacrylate and 100 parts of toluene, and further adding 1.5 parts of benzoyl peroxide to the flask, the contents were heated to 90° to 100° C. After maintaining that temperature for 3 hours, 2 parts of benzoyl peroxide was further added and the reaction system was held at the above temperature for further 4 hours, thereby completing the copolymerization. Then a cooling pipe was attached to the flask in order to remove the condensed solvent outside the flask and the heating was continued at an outside temperature of 120° to 140° C. with stirring to remove about 60% of the toluene. After that, the pressure in the flask was reduced to 200 mmHg and the outside temperature was raised to 140° to 150° C. to remove the remaining toluene completely. The thus obtained copolymer was cooled, solidified and pulverized to fine particles (a particle size of 6 mesh) by using a pulverizer. As the result, acrylic resin powder A was prepared.

| Top coat A | Parts |
| --- | --- |
| Acrylic resin power A | 100 |
| Decane dicarboxylic acid | 13 |
| Surface leveling agent (trademark: Modaflow, made by Mitsubishi Monsanto Chemical Co.) | 1 |
| | 114 parts |

The mixture of the above formula was fused and kneaded at about 100° C. for 10 minutes by using a heating roller. Then it was cooled and pulverized into fine powder of 20 to 100 microns in particle size to obtain the top coat A.

(D) Coating

Steel sheets (size: 300×90×0.8 mm, spec: JIS G 3310, treated with zinc phosphate) were applied with an epoxy ester resin electrodeposition primer (trademark: Electron No. 1200, made by Kansai Paint Co., Ltd.) The base coat A which was ajusted to have a viscosity of 14 seconds, was applied to the above coated surfaces with using an air spray gun (trademark: Devilbiss JGA 502) to form coating films of 15 to 25 microns in dried thrickness of the base coat A. The coated steel sheets were settled for about 5 minutes at room temperature, then the top coat A was applied to the surface of the coated steel sheets to form coatings of 60 to 80 microns thickness after baking by using an electrostatic spraying gun (trademark: Stajet, made by Sammes Inc., France) at an electric charge of −80 KB. Then, the coated steel sheets were baked in a oven at 170° C. for 20 minutes so as to cure both the coating layer simultaneously. The thus obtained coatings were quite excellent without gushing, yellowing and orange peel, and the metallic effect and the gloss of the coatings were quite good. The results of tests are shown in the following Table 1.

COMPARATIVE EXAMPLE 1

(A) Preparation of base coat B

The same non-aqueous dispersion resin as that of (B) of Example 1 was used for the preparation of a base coat B of the following formula.

| Base coat B | Parts |
| --- | --- |
| Non-aqueous dispersion resin (in n-heptane) | 125.0 |
| n-butanol modified melamine formaldehyde resin varinish (trademark: Melan 28 containing 60% of non-voltaile matter, made by Hitachi Chemical Industry Co., Ltd.) | 41.7 |
| Non-leafing type powdered aluminum paste (Aluminum Paste #1109 MA | 12.0 |
| | 178.7 parts |

(B) Coating

The same surface treated steel sheets as those in (D) of Example 1 were coated with the same electrodeposition primer, and in like manner as the coating method of (D) of Example 1, the above steel sheets were further applied with the base coat B which is followed by settling for 5 minutes at room temperature. Then, the top coat A (cf. Example 1, (C)) was applied to the above steel sheets and the coated films were cured by baking. The gushing was caused to occur in the obtained coating films and the gloss was low, and further, the metallic effect was inferior. The test results thereof are shown in the following Table 1.

EXAMPLE 2

(A) Preparation of top coat B

Mixed monomers of 20 parts of styrene, 25 parts of methyl methacrylate, 15 parts of n-butyl acrylate, 15 parts of ethyl acrylate and 25 parts of hydroxyethyl methacrylate were copolymerized in like manner as (C) of Example 1, to prepare acrylic resin powder B.

By using this resin, a top coat B was prepared in accordance with the method of (C) of Example 1 with the following formula:

| Top coat B | parts |
| --- | --- |
| Acrylic resin powder B | 65 |
| Blocked isocyanate curing agent (trademark: Adduct B-1870, made by Veba Co., West Germany) | 35 |
| Surface levelling agent (Modaflow) | 1 |
| | 101 parts |

(B) Coating

Surface treated steel sheets were applied with the same electrodeposition primer as that of (D) of Example 1 and they were further applied with the base coat A (cf. (B) of Example 1) in like manner as (D) of Example 1, thereby forming the coating films of base coat A of 30 to 40 microns in dried thickness. The coated sheets were then settled for 5 minutes and they were further applied with the top coat B by electrostatic coating. Both the coating layers were then cured simultaneously by baking at 170° C. for 25 minutes. The thus obtained coating films were free from gushing, yellowing and orange peels, while the metallic effect and the gloss were quite good. The test results of these coating films are shown in the following Table 1.

EXAMPLE 3

(A) Preparation of base coat C

Mixed monomers of 15 parts of styrene, 20 parts of methyl methacrylate, 30 parts of ethyl acrylate, 21 parts of n-butyl methacrylate, 12 parts of 2-hydroxyethyl methacrylate and 2 parts of acrylic acid were copolymerized in xylene with using $\alpha,\alpha'$-azobisisobutyronitrile as a polymerization initiator to obtain a 50% solution of acrylic resin. By using this resin solution, a base coat C was prepared with the following formula:

| Base coat C | Parts |
| --- | --- |
| 50% acrylic resin solution | 160 |
| Modified melamine formaldehyde resin solution A (cf. (A) of Example 1) | 40 |
| Non-leafing type powdered aluminum paste (aluminum Paste #1109 MA,) | 12 |
| | 212 parts |

(B) Coating

Surface treated steel sheets were applied with the same electrodeposition primer as that of (D) of Example 1 and they were further applied with the base coat C in like manner as (D) of Example 1 to form coating films of the base coat C of 25 to 35 microns in dried thickness. The coated surfaces were than heated to 100±10° C. for 5 minutes in a oven. After that, the top coat A (cf. (C) of Example 1) was applied to the coated surfaces in like manner as the coating method of (D) of Example 1 and baked at 170° C. for 20 minutes.

The obtained coating films were free from the defects of gushing, yellowing and orange peels, and were excellent in the metallic effect and gloss. The test results of them are shown in the following Table 1.

COMPARATIVE EXAMPLE 2

(A) Preparation of base coat D

A base coat D was prepared according to the following formula:

| Base coat D | Parts |
| --- | --- |
| 50% acrylic resin solution (cf. (A) of Example 3) | 160 |
| n-Butanol modified melamine formaldehyde resin varnish (Melan 28) | 33 |
| Non-leafing type powdered aluminum paste (Aluminum Paste #1109 MA,) | 12 |
| | 205 parts |

(B) Coating

Surface treated steel sheets were applied with the same electrodeposition primer as that of (D) of Example 1 and they were further applied with the base coat D in like manner as (D) of Example 1. After that, they were settled for 5 minutes at room temperature. Then, the top coat A (cf. (C) of Example 1) was applied to the coated surfaces and the coating films were baked at 170° C. for 20 minutes. The obtained coating films suffered gushing and the gloss thereof was low, further, the metallic effect of the coating films was worse. The rest results of these coating films are shown in the following Table 1.

EXAMPLE 4

(A) Preparation of base coat E

| Base coat E | Parts |
| --- | --- |
| Acrylic resin emulsion (trademark: Almatex XV, non-volatile matter: 45%, Toatsu Chemicals, Inc.) | 111.1 |
| Water-soluble acrylic resin varnish (trademark: Almatex XV-WC, non-volatile matter: 50%, made by Mitsui Toatsu Chemicals, Inc.) | 60.0 |
| Modified melamine formaldehyde resin solution A (cf. (A) of Example 1) | 40.0 |
| Non-leafing type powdered aluminum paste (Aluminum Paste #1109 MA,) | 12.0 |
| Ethylene glycol monobutyl ether | 6.0 |
| Diethylene glycol monobutyl ether | 6.0 |
| | 235.1 parts |

The base coat E was prepared in accordance with the above formula. The base coat E was a water thinnable type and contained 49% of non-volatile matter.

(B) Coating

Surface treated steel sheets were applied with the same electrodeposition primer as that of (D) of Example 1. The base coat E was reduced to a viscosity of 26 seconds by using a thinner consisting of 80 parts of deionized water and 20 parts of diethylene glycol monobutyl ether. The thinned base coat E was applied to the above steel sheets to form coating films of 15 to 25 microns in dried thickness by using an air spray gun (trademark: Devilbiss JGA 502) in a coating both of a temperature of 25° C. and a relative humidity of 50%. The coated steel sheets were settled at room temperature for 5 to 10 minutes, after that, the top coat A (cf. (C) of Example 1) was applied to the coated surfaces of the steel sheets by means of electrostatic spraying under the same conditions as those of (D) of Example 1. Both the coating films were simultaneously cured by baking at 170° C. for 20 minutes. The obtained coating films were free from the defects of gushing, yellowing and serious orange peels, and the metallic effect and gloss of the coating films were quite good. The test results thereof are shown in the following Table 1.

COMPARATIVE EXAMPLE 3

(A) Preparation of base coat F

| Base coat F | Parts |
| --- | --- |
| Acrylic resin emulsion (Almatex XV) | 111.1 |
| Water-soluble acrylic resin varnish (Almatex XV-WC) | 60.0 |
| Methanol modified melamine formaldehyde resin varnish (trademark: Sumimal M-62W, non-volatile matter: 70%, made by Sumitomo Chemical Co., Ltd.) | 28.6 |
| Non-leafting type powdered aluminum paste (Aluminum Paste #1109 MA) | 12.0 |
| Isopropyl alcohol | 12.0 |
| | 223.7 parts |

According to the above formula, the base coat F was prepared, which contained 48% of non-volatile matter and could be diluted with water.

(B) Coating

Surface treated steel sheets were applied with the same electrodeposition primer as that of (D) of Example 1 In accordance with the coating method of (B) of Example 4, the base coat F was applied to the surfaces of the above steel sheets and the coated steel sheets were settled for 5 to 10 minutes at room temperature. Then the top coat A (cf. (C) of Example 1) was applied to the coated steel sheets by means of electrostatic coating and the baking was carried out at 170° C. for 20 minutes. In the coating films thus obtained, gushing and yellowing were caused to occur, and the metallic effect and gloss were inferior. The test results thereof are shown in the following Table 1.

EXAMPLE 5

(A) Preparation of modified melamine formaldehyde resin solution B

By using 126 parts of melamine, 550 parts of 37% formaldehyde aqueous solution and 1000 parts of diethylene glycol monobutyl ether, reaction was performed in like manner as (A) of the foregoing Example 1 to obtain a modified melamine formaldehyde resin solution B containing 50% of non-volatile matter.

(B) Preparation of base coat G

According to the following formula, a base coat G was prepared.

| Base coat G | parts |
| --- | --- |
| 50% acrylic resin solution (cf. (A) of Example 3) | 160 |
| Modified melamine formaldehyde resin solution B | 40 |
| Non-leafting type powdered aluminum paste (Aluminum Paste #1109 MA) | 12 |
| | 212 parts |

(C) Coating

Surface treated steel sheets were applied with the same electrodeposition primer as that of (D) of Example 1. In accordance with the coating method of (D) of Example 1, the base coat G was applied to the above steel sheets to form coating films of 20 to 30 microns in dried thickness. They were then settled for 5 minutes at room temperature and after that, the top coat A (cf. (C) of Example 1) was applied to the steel sheets and baked at 170° C. for 20 minutes. The obtained coating films were free from the defects of gushing, yellowing and serious orange peel, and the metallic effect and gloss of the coating films were quite good. The test results thereof are shown in the following Table 1.

COMPARATIVE EXAMPLE 4

(A) Preparation of modified melamine formaldehyde resin solution C

By using 126 parts of melamine, 550 parts of 37% formaldehyde aqueous solution and 1000 parts of tridecanol (b.p.at 1 atm.: about 270° C.), reaction was carried out in like manner as (A) of the foregoing Example 1 to obtain a modified melamine formaldehyde resin solution C containing 50% of non-volatile matter.

(B) Preparation of base coat H

In accordance with the following formula, a base coat H was prepared.

| Base coat H | Parts |
| --- | --- |
| 50% acrylic resin solution (cf. (A) of Example 3) | 160 |
| Modified melamine formaldehyde resin solution C | 40 |
| Non-leafting type powdered aluminum paste (Aluminum Paste #1109 MA) | 12 |
| | 212 parts |

(C) Coating

Surface treated steel sheets were applied with the same electrodeposition primer as that of (D) of Example 1. In accordance with the coating method of (D) of Example 1, the base coat H was applied to the above steel sheets to form coating films of 20 to 30 microns in dried thickness. They were then settled for 5 minutes at room temperature and after that, the top coat A (cf. (C) of Example 1) was applied to the steel sheets and baked at 170° C. for 20 minutes. In connection with the obtained coating, even though gushing was not caused to occur, the metallic effect, solvent resistance and physical properties (especially the hardness) of the coating films were worse. The test results of the coating films are shown in the following Table 1.

EXAMPLE 6

(A) Preparation of modified melamine formaldehyde resin solution D

By using 126 parts of melamine, 550 parts of 37% formaldehyde aqueous solution and 1000 parts of 1-nonanol, reaction was carried out in like manner as (A) of the foregoing Example 1 to obtain a modified melamine formaldehyde resin solution D containing 50% of non-volatile matter.

(B) Preparation of base coat I

In accordance with the following formula, a base coat I was prepared.

| Base coat | parts |
| --- | --- |
| 50% acrylic resin solution (cf. (A) of Example 3) | 160 |
| Modified melamine formaldehyde resin solution D | 40 |
| Non-leafting type powdered aluminum paste (Aluminum Paste #1109 MA) | 12 |

-continued

| Base coat | parts |
|---|---|
| | 212 parts |

(C) Coating

Surface treated steel sheets were applied with the same electrodeposition primer as that of (D) of Example 1. In accordance with the coating method of (D) of Example 1, the base coat I was applied to the above steel sheets to form coating films of 20 to 30 microns in dried thickness. They were then settled for 1 minute at room temperature and after that, the top coat A (cf. (C) of Example 1) was applied to the steel sheets and baked at 170° C. for 20 minutes. The thus obtained coating films were free from the defects of gushing, yellowing and serious orange peels, and the metallic effect and gloss of the coating films were quite good. The test results thereof are shown in the following Table 1.

EXAMPLE 7

(A) Preparation of modified melamine formaldehyde resin solution E

By using 126 parts of melamine, 550 parts of 37% formaldehyde aqueous solution and 1000 parts of 1-undecanol, the reaction just like that of (A) of Example 1 was performed. Thereby, a modified melamine formaldehyde resin solution E containing 50% of non-volatile matter was prepared.

(B) Preparation of base coat J

According to the following formula, a base coat J was prepared.

| Base coat J | Parts |
|---|---|
| 50% acrylic resin solution (cf. (A) of Example 3) | 160 |
| Modified melamine formaldehyde resin solution E | 40 |
| Non-leafing type powdered aluminum paste (Aluminum Paste #1109 MA) | 12 |
| | 212 parts |

(C) Coating

Surface treated steel sheets were applied with the same electrodeposition primer as that of (D) of Example 1. In accordance with the coating method of (D) of Example 1, the base coat J was applied to the above steel sheets to form coating films of 20 to 30 microns in dried thickness. They were then settled for 10 minutes at room temperature and after that, the top coat A (cf. (C) of Example 1) was applied to the steel sheets and baked at 170° C. for 20 minutes. The thus obtained coating films were free from the defects of gushing, yellowing and serious orange peels, and the metallic effect and gloss of the coating films were quite good. The test results thereof are shown in the following Table 1.

EXAMPLE 8

(A) Preparation of modified melamine formaldehyde resin solution F

By using 126 parts of melamine, 550 parts of 37% formaldehyde aqueous solution and 1000 parts of ethylene glycol monoacetate, the reaction was performed in like manner as (A) of the foregoing Example 1 to obtain a modified melamine formaldehyde resin solution F containing 50% of non-volatile matter.

(B) Preparation of base coat K

According to the following formula, a base coat K was prepared.

| Base coat K | Parts |
|---|---|
| 50% acrylic resin solution (cf. (A) of Example 3) | 160 |
| Modified melamine formaldehyde resin solution F | 40 |
| Non-leafing type powdered aluminum paste (Aluminum Paste #1109 MA) | 12 |
| | 212 parts |

(C) Coating

Surface treated steel sheets were applied with the same electrodeposition primer as that of (D) of Example 1. In accordance with the coating method of (D) of Example 1, the base coat K was applied to the above steel sheets to form coating films of 20 to 30 microns in dried thickness. They were then settled for 5 minutes at room temperature and after that, the top coat A (cf. (C) of Example 1) was applied to the steel sheets and baked at 170° C. for 20 minutes. Thus obtained coating films were free from the defects of gushing, yellowing and serious orange peels, and the metallic effect and gloss of the coating films were quite good. The test results of them are shown in the following Table 1.

In Table 1, the evaluation of the coating films was made with naked eyes. The standards for the evaluated symbols are as follows:
Good: No defect was found in the coating film.
Fair: Slight defect was found
Poor: Defects were found apparently
Bad: Defects of coating films were serious Table 1

| Ex. | Item base coat | top coat | Average dry film thickness (μ) Base coat | Top coat | Modifying agent for melamine formaldehyde resin | Appearance of coating film | Metallic feeling | gloss |
|---|---|---|---|---|---|---|---|---|
| Example 1 | A | A | 18 | 72 | Ethylene glycol monobutyl ether | Good | Good | Good |
| Comp. Ex. 1 | B | A | 17 | 74 | n-Butanol | Poor (gushing) | Fair | Poor |
| Example 2 | A | B | 35 | 70 | Ethylene glycol monobutyl ether | Good | Good | Good |
| Example 3 | C | A | 30 | 75 | Ethylene glycol monobutyl ether | Good | Good | Good |
| Comp. Ex. 2 | D | A | 18 | 73 | n-Butanol | Poor (gushing) | Fair | Poor |
| Example | E | A | 20 | 75 | Ethylene glycol | Good | Good | Good |

Table 1-continued

| Ex. | Item | base coat | top coat | Average dry film thickness (μ) Base coat | Average dry film thickness (μ) Top coat | Modifying agent for melamine formaldehyde resin | Appearance of coating film | Metallic feeling | gloss |
|---|---|---|---|---|---|---|---|---|---|
| Example 4 | | | | | | monobutyl ether | | | |
| Comp. Ex. 3 | | F | A | 18 | 73 | Methanol | Poor (Gushing Yellowing) | Fair | Fair |
| Example 5 | | G | A | 25 | 80 | Diethylene glycol monobutyl ether | Good | Good | Good |
| Comp. Ex. 4 | | H | A | 23 | 78 | Tridecanol | Poor | Fair | Good |
| Example 6 | | I | A | 21 | 72 | 1-Nonanol | Good | Good | Good |
| Example 7 | | J | A | 29 | 80 | 1-Undecanol | Good | Good | Good |
| Example 8 | | K | A | 23 | 75 | Ethylene glycol monoacetate | Good | Good | Good |

What is claimed is:

1. A method of metallic finishing which comprises the steps of:
    applying a thermosetting liquid coating material to a substrate by air spraying or electrostatic spraying, said liquid coating material containing a film forming component of thermosetting resin and a pigment for giving metallic appearance to the finished coating and said thermosetting resin component containing a cross linking agent of melamine formaldehyde resin modified with a monohydroxyl compound having a boiling point in the range of 150° to 250° C. at 1 atm.,
    further applying thereon a transparent thermosetting powder coating material by electrostatic spraying, and
    baking both coated films to cure them simultaneously.

2. The method of metallic finishing as claimed in claim 1, in which said monohydroxyl compound used for the modification of said melamine formaldehyde resin is at least one member selected from the group consisting of aliphatic monohydric alcohols, aromatic monohydric alcohols, alicyclic monohydric alcohols, glycol monoalkyl ethers and glycol monoalkyl esters having boiling points of 150° to 250° C. at 1 atm.

3. The method of metallic finishing as claimed in claim 1, in which said thermosetting resin contains a functional resin component which is combined with said melamine formaldehyde resin, said functional resin component being at least one member selected from the group consisting of hydroxyl group functional arcylic copolymer resins of organic solvent type, non-aqueous dispersion type or aqueous dispersion type, non-oil or oil modified alkyd resins or polyester resins of organic solvent type, aqueous solution type or aqueous dispersion type and epoxy resin esters of organic solvent type, aqueous solution type or aqueous dispersion type.

4. The method of metallic finishing as claimed in claim 1, in which said pigment for giving metallic appearance is at least one member selected from the group consisting of aluminum powder, bronze powder, copper powder, mica powder, treated mica powder and micaceous iron oxide.

5. The method of metallic finishing as claimed in claim 1, in which 3 to 30 parts by weight of said pigment for giving metallic appearance is used to 100 parts by weight (as resin solid) of said film forming component of thermosetting resin.

6. The method of metallic finishing as claimed in claim 1, in which a coloring pigment or pigments are added to said thermosetting liquid coating material.

7. The method of metallic finishing as claimed in claim 1, in which said monohydroxyl compound is selected from the group consisting of ethylene glycol monobutyl ether, diethylene glycol monobutyl ether, 1-nonanol, 1-undecanol and ethylene glycol monoacetate.

8. The method of metallic finishing as claimed in claim 1, in which said modified melamine formaldehyde resin is the reaction product of 2-8 mols of formaldehyde and 8-15 mols of said monohydroxyl compound per mol of melamine.

9. The method of metallic finishing of claim 1, in which said transparent thermosetting powder coating material comprises a copolymer of styrene, methyl methacrylate, n-butyl acrylate, ethyl acrylate and hydroxyethyl methacrylate and wherein said thermosetting liquid coating material comprises a resin of ingredients comprising styrene, methyl methacrylate, 2-ethylhexyl acrylate, hydroxyethyl acrylate and acrylic acid, said pigment is powdered aluminum and said monohydroxyl compound is ethylene glycol monobutyl ether.

10. The method of metallic finishing as claimed in claim 1, in which said transparent thermosetting powder coating material comprises a copolymer of styrene, methyl methacrylate, n-butyl acrylate, ethyl acrylate, glycidyl methacrylate and hydroxyethyl methacrylate, said pigment is powdered aluminum, and said monohydroxyl compound is selected from the group consisting of ethylene glycol monobutyl ether, diethylene glycol monobutyl ether, 1-nonanol, 1-undecanol and ethylene glycol monoacetate.

* * * * *